United States Patent [19]
Mallary

[11] Patent Number: 5,134,535
[45] Date of Patent: Jul. 28, 1992

[54] ARCHITECTURE FOR A THIN-FILM MAGNETIC RECORDING HEAD

[75] Inventor: Michael L. Mallary, Berlin, Mass.

[73] Assignee: Digital Equipment Corporation, Maynard, Mass.

[21] Appl. No.: 644,029

[22] Filed: Jan. 18, 1991

[51] Int. Cl.⁵ .............................................. G11B 5/147
[52] U.S. Cl. ...................................................... 360/126
[58] Field of Search ................................ 360/125–126

[56] References Cited

U.S. PATENT DOCUMENTS

| | | |
|---|---|---|
| 3,344,237 | 10/1967 | Gregg . |
| 3,549,825 | 12/1970 | Trimble . |
| 3,685,144 | 8/1972 | Trimble . |
| 3,881,191 | 4/1975 | Potter et al. . |
| 4,613,843 | 9/1986 | Esper et al. . |
| 4,750,072 | 6/1988 | Takagi ................................ 360/126 |
| 4,780,781 | 10/1988 | Sano et al. . |
| 4,797,765 | 1/1989 | Ezaki ................................ 360/126 X |
| 4,896,417 | 1/1990 | Sawada et al. . |
| 5,032,945 | 7/1991 | Argyle .............................. 360/125 X |

FOREIGN PATENT DOCUMENTS

3828270A1 2/1990 Fed. Rep. of Germany .

*Primary Examiner*—A. J. Heinz
*Attorney, Agent, or Firm*—Cesari & McKenna

[57] ABSTRACT

A thin-film head architecture is provided that incorporates an asymmetrical arrangement of poles along a defined area of the head extending from the pole tips to a flux via in the yoke region. The flux conducts vertically by small-angle rotations within the defined area of the head during read operations, thereby obviating the need for horizontal conduction by domain wall motion.

7 Claims, 6 Drawing Sheets

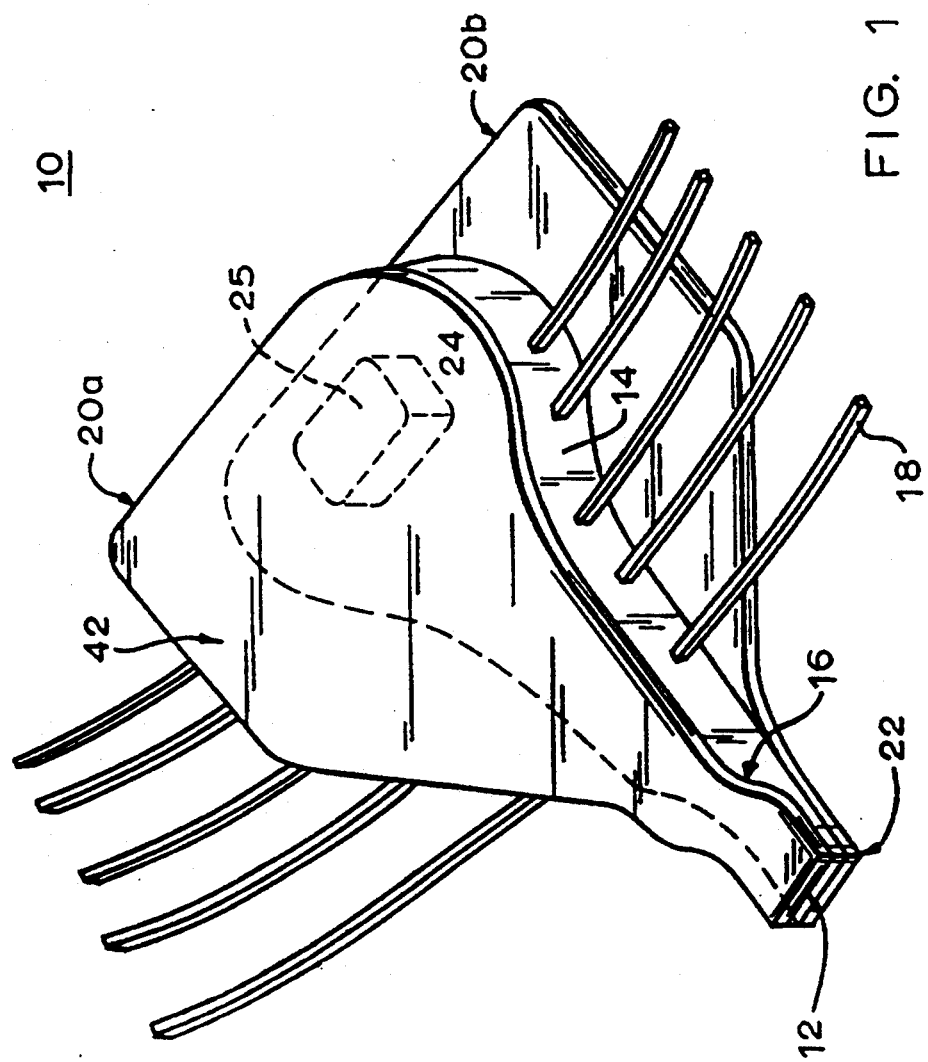

ARCHITECTURE FOR A THIN-FILM MAGNETIC RECORDING HEAD

FIELD OF THE INVENTION

This invention relates generally to thin-film magnetic recording heads and more specifically to a thin-film magnetic head having low inductance and high efficiency.

BACKGROUND OF THE INVENTION

Advances in the field of digital magnetic recording have led to an increase in recording densities of storage media, such as magnetic disks. The higher overall densities can be attributed to increases in both linear and track densities. Specifically, each of the recorded signals occupies a smaller are of the medium and thus has a smaller energy content in the form of magnetic flux. Accordingly, thin-film read/write heads of reduced dimensions and higher sensitivity are needed to offset the weaker signals retrievable from the storage media during read operations.

The performance of a thin-film head depends upon the magnetic properties of its materials and the geometry of the head structure. A conventional thin-film magnetic head consists of two poles formed of "soft" magnetic material which is easily magnetized and has a relatively high permeability. The poles are joined at one end, called the yoke, and are separated by a gap layer that is precisely defined at the other end, called the tip. The turns of a magnetic coil are embedded in the gap layer adjacent the yoke. During read and write operations, the head is positioned with the tip portion adjacent the disk; the coil provides a mechanism for driving magnetic flux into as well as sensing magnetic flux from the head.

In order to facilitate magnetic flux conduction between the poles and coil, the yoke region is made as wide as possible; that is, the poles are generally heart-shaped and superimposed upon one another in a symmetrical configuration. Such a large surface area minimizes the yoke resistance and increases the available amplitude of the signal emanating from the head; however, it also increases inductance and flux leakage, i.e. flux in the head that does not link the coil.

Thin-film head materials are composed of individual regions or domains with local magnetizations equal to the saturation magnetization of the material. The boundaries between these regions are called domain walls. When a head is writing or reading data, the rotation of magnetization within these domains, i.e. "conduction by rotation", or the shift of domain walls, i.e. "domain wall motion", constitutes the head response to magnetic fields.

Thin-film heads are manufactured by processes such as electroplating and vacuum deposition through a succession of masks onto a wafer, and the wafer is then diced into individual units. During deposition of the magnetic material, uniaxial anisotropy is induced by the imposition of a strong magnetic field. The field creates a magnetic anisotropy in the material that results in a domain pattern having a rest state of magnetization in particular directions, i.e. the "easy axes". When an easy axis is transverse to the direction of flux conduction, the flow of flux through the head can occur by small-angle rotations of the rest state of magnetization away from the easy axis. In other words, by inducing domain patterns having a series of easy axes of magnetization transverse to the direction desired to propagate flux, the magnetic flux can conduct by the process of small-angle rotations of these axes.

Magnetic flux can also be conducted through a ferromagnetic material by domain wall motion. However, this mode of conduction is characterized by a relatively low permeability at low field levels. This mode of conduction is also ineffective at high frequencies because of the long time delay associated with the shifting of domain walls and the loss of permeability due to skin effect. Domain wall motion is therefore much less suitable than axis rotation for the sensing of weak, high-frequency fields associated with high-density disks.

Moreover, conduction by domain wall motion is also more susceptible than axis rotation to domain structure imperfections, e.g. inhomogeneity of the thin-film materials, during read operations. When magnetic flux encounters a defect in a domain wall during conduction, signal processing distortion results. If the drive field is insufficient to move the wall past the defect, e.g. pinning site, the wall will stick permanently and read-back will cease. Otherwise, the domain wall will stick temporarily and flux conduction will pause with a corresponding loss of output voltage. The wall subsequently snaps free and a spurious voltage spike occurs, resulting in Barkhausen noise.

Further discussions of flux conduction in thin-film heads and comparison of conduction by rotation and domain wall motion are contained in the following papers, which are expressly incorporated by reference as though fully set forth herein:

Mallary, M., et al. "Three Dimensional Transmission Line Model for Flux Conduction in Thin-Film Recording Heads", Journal of Applied Physics, Vol 67, pp 4863–4865 (1990);

Mallary, M., et al. "Frequency Response of Thin Film Heads with Longitudinal and Transverse Anisotropy", IEEE Transactions on Magnetics, Vol 26, pp 1334–1336 (1990);

Mallary, M., "Conduction of Flux at High Frequencies in Permalloy Strips by Small-Angle Rotations", Journal of Applied Physics, Vol 57, pp 3952–3954 (1985); and Mallary, M., and Smith, A. B., "Conduction of Flux at High Frequencies by a Charge-Free Magnetization Distribution", IEEE Transactions on Magnetics, Vol MAG-24, p. 2374 (1988).

One approach to resolving the inductance and flux leakage issues associated with conventional thin-film head structures has been to arrange the poles of the magnetic head a certain distance from one another in a plane parallel to the surface of the poles. The poles overlap at the tip and at a portion of the yoke, referred to as the "flux via" region, but are laterally staggered elsewhere. This arrangement minimizes the overlapping area of the poles, which in turn reduces the flux leakage and inductance of the head. However, the magnetic flux must conduct in a horizontal or lateral direction by domain wall motion between the tip and the flux via.

Therefore, it is among the objects of this invention to provide an architecture that increases the efficiency of thin-film magnetic heads.

Another object of the present invention is to provide a thin-film head structure that increases the amplitude of signals processed during read operations.

Another object of the invention is to reduce domain wall motion induced noise (Barkhausen noise) in thin-film heads by minimizing the lateral conduction of magnetic flux.

SUMMARY OF THE INVENTION

Briefly, a thin-film magnetic head constructed in accordance with the invention minimizes the need for conduction of magnetic flux in the lateral direction by providing poles that overlap only slightly. The architecture of the head inhibits flux leakage while providing a flux path that encourages flux conduction by rotation.

More particularly, the thin-film head architecture incorporates an asymmetrical pole arrangement resulting in the alignment of the poles along a defined path generally parallel to an axis extending between the tip and yoke portions of the head. Magnetic flux conducts vertically by rotation within this defined area of the head during read operations, thereby obviating the need for transverse conduction by domain wall motion. Since low levels of magnetic flux constitute the drive field for read operations, conduction by rotation allows for higher amplitude of read-back signals than conduction by domain wall motion.

BRIEF DESCRIPTION OF THE DRAWINGS

The above and further advantages of the invention may be better understood by referring to the following description in conjunction with the accompanying drawings, in which:

FIG. 1 is a perspective view of the architecture of a two-pole thin-film magnetic head according to the invention;

DETAILED DESCRIPTION OF ILLUSTRATIVE EMBODIMENT

Figure 1A:
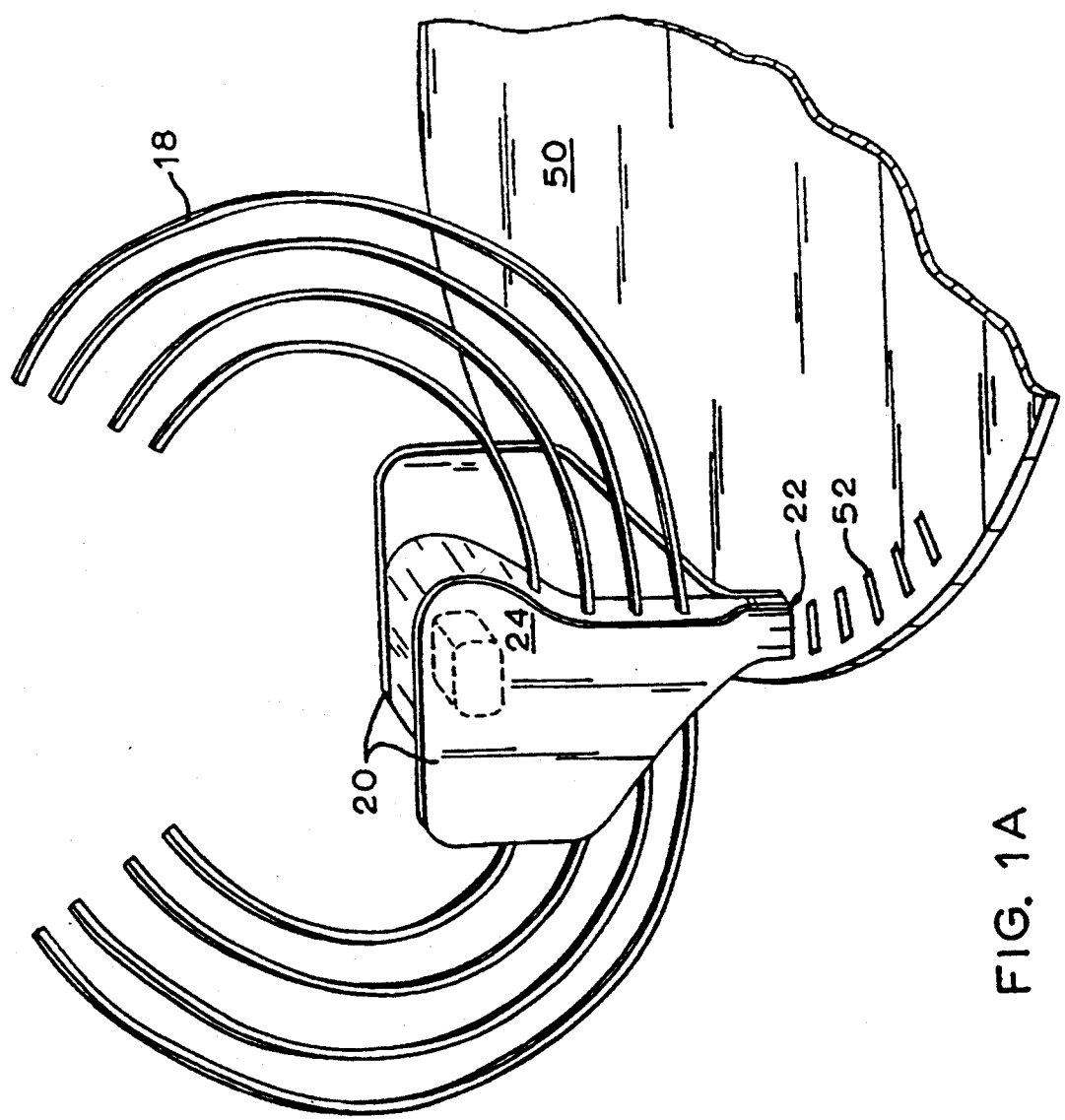
FIG. 1a is a perspective view of the thin-film head of FIG. 1 in relation, to a storage media.

As shown in FIG. 1, a thin-film magnetic head 10 includes an upper pole 20a and a lower pole 20b, generally designated poles 20. The poles are generally P-shaped, and are formed from a ferromagnetic flux-conductive material such as a nickel-iron (NiFe) alloy. The poles 20 are physically separated at the narrow end, or tip 22, by a gap 12 which provides magnetic isolation between the poles. In addition, the poles 20 are magnetically connected at the wide end, or yoke 24, at an area referred to as the "flux via" region 25.

The structure is reinforced by a rigid gap layer 14 disposed between the poles 20 and extending from the tip 22 to the yoke 24. A flux via (not shown) extends through the gap layer 14 and mechanically connects the poles 20 with the flux-conductive material. The gap layer 14 is formed of a material which is both non-magnetic and electrically insulating, such as $Al_2O_3$.

A ridge 16, formed in the upper pole 20a, allows the gap layer 14 to accommodate a plurality of coiled electrical conductors, or winding 18, between the poles 20. The winding 18 serves to conduct electric current to and from the head 10. In addition, other configurations of the thin-film head 10 may include a third pole (not shown) disposed between the upper pole 20a and lower pole 20b to form a second gap.

With reference also to FIG. 1a, the tip 22 is positioned opposite a magnetic medium, such as a disk 50, which stores recorded information. Other types of magnetic media, such as magnetic tape, may be used with the head 10. During write operations, a current of either polarity is applied through the winding 18. This creates a magnetic field in a direction along a path between the yoke 24 and tip 22, with sufficient strength to set the magnetization on a small portion, or track 52, of the disk 50 adjacent the tip 22.

During read operations, the process is reversed. As various tracks 52 having different recorded polarizations pass by the tip 22, the magnetic fields emanating from the tracks 52 pass through the poles 20. Thus a changing magnetic flux travels around the head 10 in a path defined by the domain structure of the pole material, as described further herein. The changing magnetic flux induces a voltage in the winding 18, which provides an electrical indication of the sensed magnetic fields.

In accordance with the teachings of the invention, a read/write thin-film magnetic head architecture is provided that increases the efficiency of the head 10. More specifically, the arrangement of the poles 20, together with the domain structure and the magnetic properties of the thin-film head materials provide a means for conducting magnetic flux vertically along a defined path by rotating the rest state magnetization of transversely oriented central domains during read operations. Additionally, the magnetic flux conducts laterally by domain wall motion during write operations.

Figure 2:
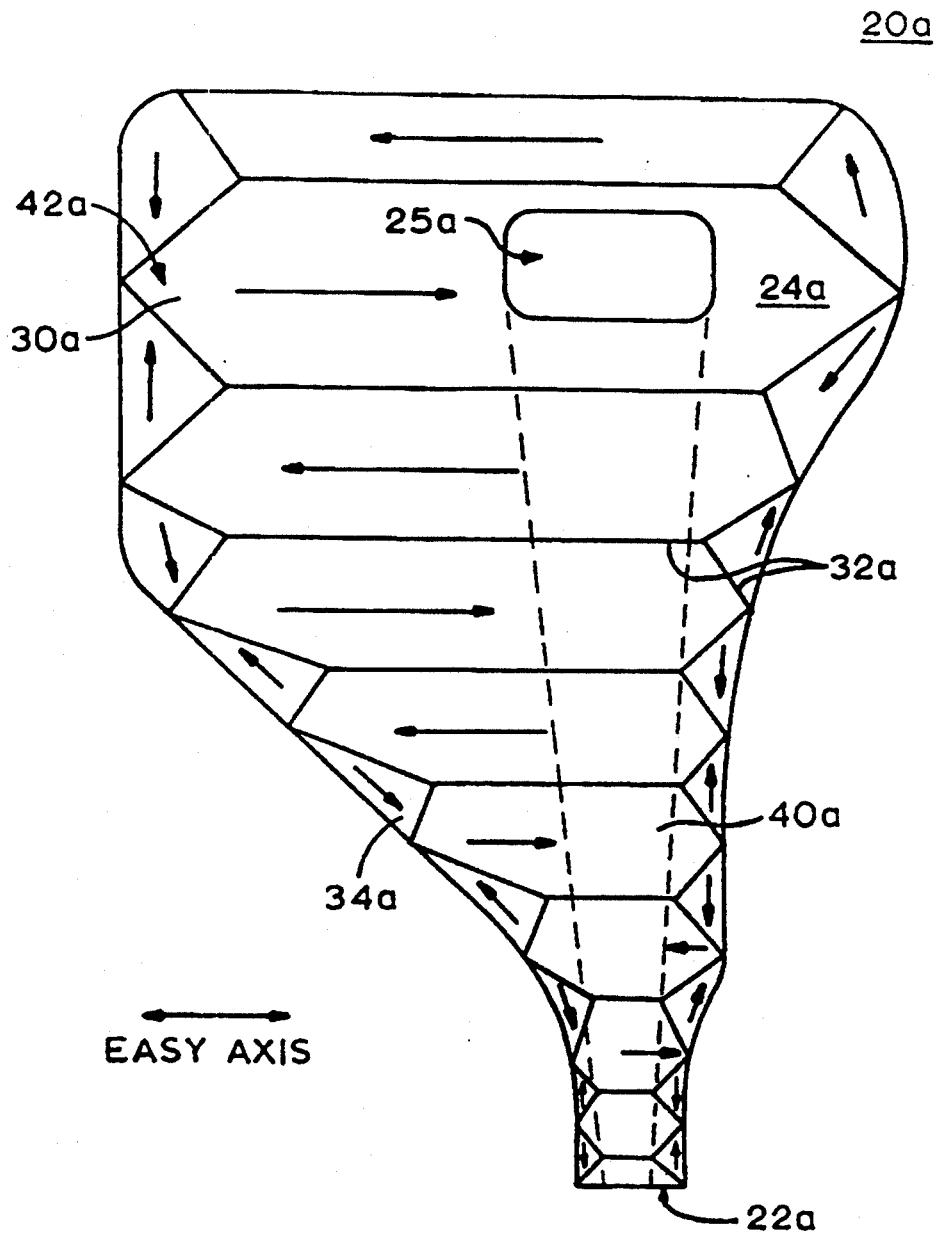
FIG. 2 is a plan view of the geometrical and domain structure of one pole of the thin-film head of FIG. 1.

FIG. 2 is a plan view of the upper pole 20a of the thin-film head 10 in accordance with the invention. Pole 20a has a generally P-shaped geometry characterized by a narrow end, or pole tip 22a and a wide end, or yoke 24a. A portion of the yoke 24a mechanically connects to pole 20b and is generally designated the flux via region 25a.

The domain structure of pole 20a has an easy axis in the indicated direction. The transversely oriented central domains 30a of pole 20a are magnetized parallel to this easy axis, but in opposing directions, separated by domain walls 32a. The domains 30a represent the rest state of magnetization, which is perpendicular to the axis connecting the tip 22a and the flux via 25a. A region of pole 20a aligned along this axis is defined as the "flux pipe" 40a. Closure domains 34a are formed at the periphery of the pole 20a with magnetizations parallel to the geometrical pattern edges. The actual domain structure of pole 20a is influenced by nicks at pattern edges, and non-magnetic inclusions and voids such as pinning sites in the film materials.

A portion of the yoke 24a extending to the left of the flux pipe 40a is defined a the wing 42a. The wing 42a structure provides a path for magnetic flux generated by head 10 to conduct laterally by domain wall motion during write operations. Although domain walls 32a are generally slow in responding to applied magnetic fields in comparison to magnetization rotation, lateral conduction of flux in the yoke 24a reduces the magnetic impedance around the head 10 during write operations. The flux pipe 40a and the geometry of the wing 42a, which eliminates edge closure domains 34a from the flux pipe 40a, facilitate conduction by rotation of the magnetic flux, particularly during read operations, as described further herein.

Although the depiction of FIG. 2 is directed to the architecture of upper pole 20a, the discussion relates equally to the structure of lower pole 20b. Lower pole 20b is generally similar in geometry and domain structure to upper pole 20a, except that the geometry of pole 20b is reversed with respect to the axis defined by the flux pipe 40a; that is, the wing 42b of pole 20b extends to the right of the flux pipe 40b. Therefore, for the remaining discussion of thin-film head 10, the flux pipe, domains, domain walls, edge closure domains, flux via, wings, yoke and tip will be generally designated 40, 30, 32, 34, 25, 42, 24 and 22, respectively.

Figure 3:
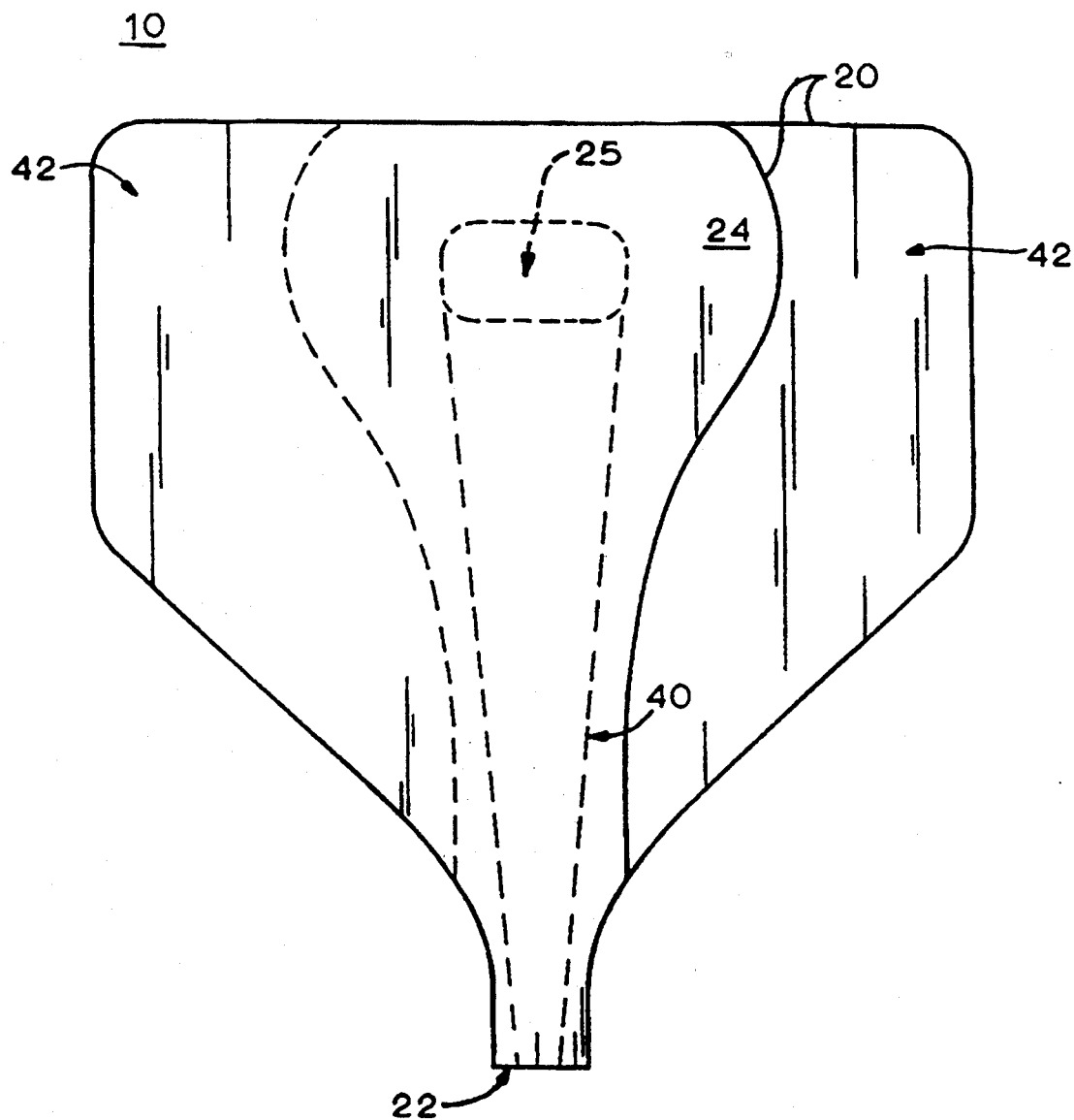
FIG. 3 is a plan view of the geometrical structure of the thin-film head of FIG. 1.

FIG. 3 is a plan view of the poles 20 of the thin-film head 10. The poles 20 are arranged in an asymmetrical manner such that only an area parallel to the axis connecting the tip 22 and the flux via 25 overlap; that is, the poles 20 overlap at the flux pipe 40. The architecture in accordance with the invention provides that the flux pipes 40 of the poles 20 be aligned, i.e. the path 40a (see FIGS. 1 and 2) of the upper pole 20a geometrically coincides with the path 40b (not shown) of the lower pole 20b. This overlap is preferably only as wide as the flux pipe 40 so as to minimize the lateral flux path and reduce domain wall motion induced noise.

Refer now to FIGS. 1–3. During read operations, the head 10 responds to rapid transitions in magnetic flux received from the disk 50. The flux changes conduct through the poles 20 and the winding 18. For conduction to occur, the component of magnetization in the direction of the pole axis extending from the tip 22 to the flux via 25 must change. Since movement of the domain walls 32 is slow, the change must come from rotation of the magnetization. The domains with magnetization transverse to the pole axis contribute to flux conduction.

Accordingly, the transversely oriented domains 30 enable the magnetic flux to "beam" from the tip 22 to the yoke 24. Magnetic flux conducts vertically by rotation within the flux pipe 40, thereby eliminating the need for lateral conduction by domain wall motion. The boundaries of flux pipe 40 are narrower than the geometric edges of the pole 20 and thus exclude the edge closure domains 34 with magnetizations parallel to the pole axis, again negating the need for lateral conduction of flux by wall motion.

Figure 4:
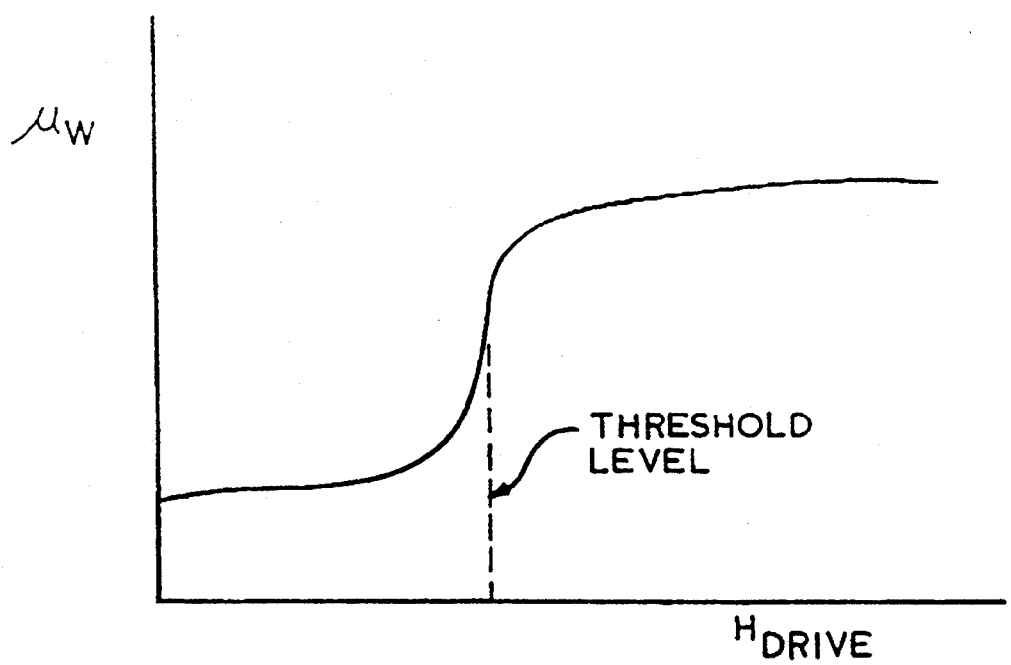
FIG. 4 is a graph showing the relationship between the permeability of domain wall motion ($u_w$) and the drive field ($H_{drive}$) associated with recorded magnetic flux.
Figure 5:
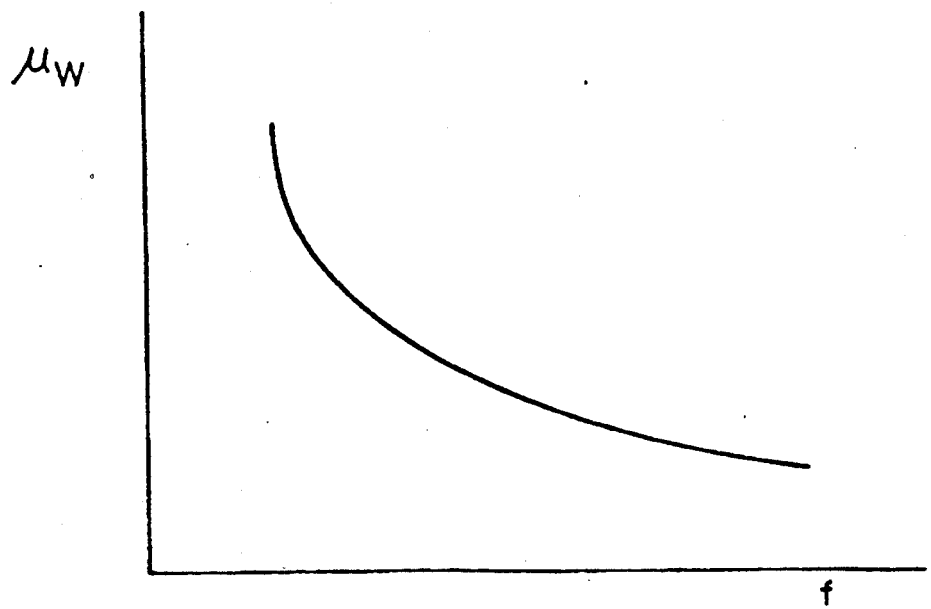
FIG. 5 is a graph showing the relationship between the permeability of domain wall motion ($u_w$) and frequency (f)

Flux beaming and conduction of the magnetic flux by rotation within the flux pipe 40 are critical to the performance of the thin-film head 10 because conduction by domain wall motion is not conducive to the high-frequency and high-density recording capability of the head 10. The high-density signals recorded on the disk 50 have low flux levels, resulting in a permeability of wall motion in thin-film materials that is lower than the threshold level needed for proper, reliable read-back of the recorded signals. The graph of FIG. 4 depicts the relationship between the drive field ($H_{drive}$) associated with the magnetic flux levels and the permeability of domain wall motion ($u_w$). Flux conduction by domain wall motion is also inhibited at high frequencies; that is, $u_w$ falls inversely with an increase in frequency (f), as graphically illustrated in FIG. 5. Thus, conduction by rotation and flux beaming provide a means for increasing the amplitude of signals from the low drive fields sensed during read operations.

During write operations, domain wall motion conduction is effective because the drive fields or magnetic flux levels are high. The flux levels can increase during write operations by increasing the supplied current; however, the magnitude of flux levels during read operations are fixed and limited to that recorded on the medium.

Figure 6:
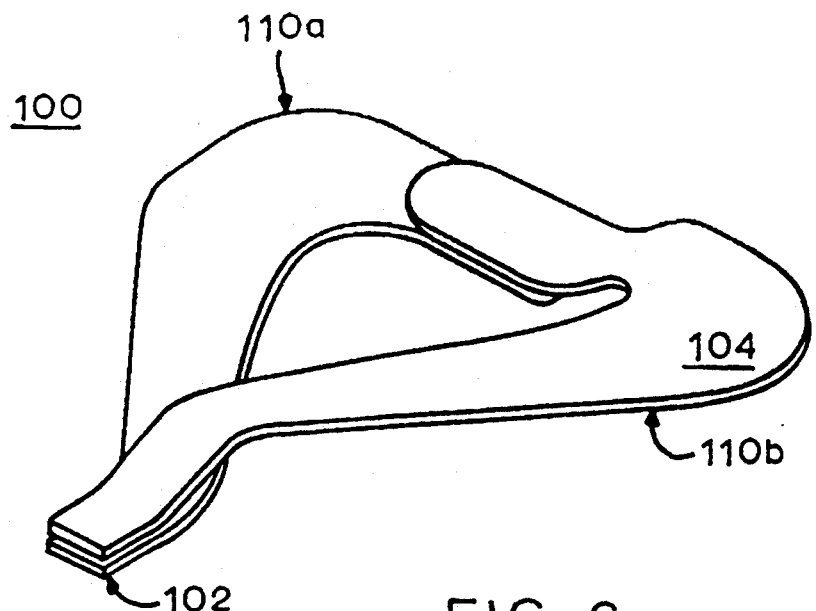
FIG. 6 is a perspective view of a prior art arrangement of poles of a thin-film magnetic head.

FIG. 6 shows the arrangement of the poles 110a, b, generally designated poles 110, of a prior art thin-film magnetic head 100. The poles 110 are physically separated from each other soon after leaving the tip 102 region. The absence of pole-overlap reduces flux leakage and inductance of the head, thereby enabling more turns of the winding before reaching the resonant frequency limit. However, this approach requires that magnetic flux conduct in the lateral direction by domain wall motion from the tip 102 to the yoke 104.

Although separating the poles 110 reduces inductance in the yoke 104, it also destroys the flux pipe structure and flux beaming function of the head 100. In other words, separation of the poles 110 prematurely terminates conduction by rotation at the edge wall region of a non-overlapped pole during read operations and the flux is forced to spread laterally by domain wall motion in order to reach the flux via region of yoke 104. However, conduction by movement of domain walls during read operations is undesirable because (i) the flux levels ($H_{drive}$) of the signals recorded on disk are very low and below the threshold level for domain wall motion, i.e. conduction by wall motion for these flux levels is poor; (ii) process defects in thin-film head materials result in pinning sites that must be overcome by increasing the drive fields before conduction can resume, thus creating distorted signal waveforms during read operations, i.e. Barkhausen noise; and (iii) conduction by wall motion is poor at high frequencies.

The thin-film head architecture in accordance with the invention reduces the separation between the poles 110 until there is a slight net overlap of the poles. The overlap results in more inductance and flux leakage than the non-overlap prior art design. However, the overlap allows for flux conduction by rotation without additional pole structure complexity and avoids the need for lateral flux conduction.

Figure 7:
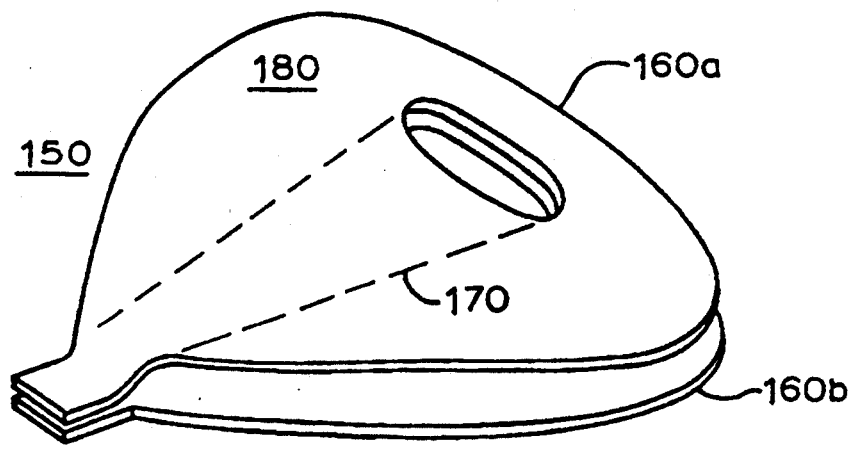
FIG. 7 is a perspective view of another prior art arrangement of poles of a thin-film magnetic head.

In FIG. 7, a conventional thin-film head 150 is shown having superimposed poles 160a, b, generally designated poles 160. Here, the poles 160 not only overlap along a flux pipe path 170, but they overlap along the entire wing region of the yoke 180. However, this head structure 150 experiences greater inductance and flux leakage than the architecture enunciated herein.

In an alternate approach to the head 150 of FIG. 7, the superimposed poles 160 are trimmed to a region slightly greater than the flux pipe path 170. Although this reduces the inductance of the head 150, it significantly affects write-over during write operations. More specifically, the elimination of wing region in the yoke 180 reduces the area needed for increased flux conduction during write operations. This trimmed head structure approach is sufficient for a read-only head.

In contrast and with reference to FIG. 3, the thin-film magnetic head 10 architecture in accordance with the invention utilizes a geometry unlike conventional prior art thin-film head designs to provide both read and write functions. By overlapping only the flux pipe region 40 of the poles 20 and retaining pole wings 42 in an asymmetrical configuration, i.e. the pole wings 42 do not overlap, the read/write thin-film head 10 has sufficient magnetic material to conduct high magnetic flux levels during write operations and thus avoid the overwrite problem. The non-overlapped wing structure does not add significantly to the inductance or leakage of the head 10. The structure provides a additional path for write operations that allows the flux to spread and conduct laterally within the yoke region 24, then concentrate at the pole tip 22 prior to recording signals on the medium. Additionally, the architecture removes edge domains of the wings 42 from the central region that conducts the read flux by rotation, i.e. the flux pipe 40.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A thin-film magnetic recording head comprising:
    a first pole having a top and a yoke including a single first wing;
    a second pole having a tip and a yoke including a single second wing; and
    a gap layer disposed between said first and second poles and including a flux via for magnetically connecting said yokes of said poles, said gap layer further containing a winding disposed therein for conducting current and driving magnetic flux into and sensing magnetic flux from said poles,
    wherein said first and second poles overlap along a flux pipe path extending between said tip and said yoke at said flux via to define a gap at said tips, and said first and second wings extend laterally, but in opposing directions, to said flux pipe path and are free of overlap with the opposed poles, each of said first and second poles having a domain structure with a rest state of magnetization generally transverse to said path, and
    wherein said magnetic flux conducts from said gap to said flux via along said flux pipe path by rotation of said rest state magnetization during read operations.

2. A thin-film magnetic recording head according to claim 1 wherein said first and second wings of said poles do not overlap and magnetic flux conducts laterally by domain wall motion from said wings to said gap during write operations.

3. A thin-film recording head comprising:
    a first magnetically conductive pole having a tip end and a yoke end with a single first wing extending laterally to a flux via region;
    a second magnetically conductive pole having a tip end and a yoke end with a single second wing extending laterally to a flux via region, but in a direction opposite that of said first wing, said first and second poles arranged in an asymmetrical configuration and magnetically connected at said flux via regions; and
    a non-magnetic gap layer disposed between said first and second poles and containing a winding disposed therein for conducting current, said winding configured to drive magnetic flux into and sense magnetic flux from said poles,
    wherein said first and second poles overlap along a path extending between said tip end and said flux via region to define a magnetically isolated gap at said tip ends, each of said first and second poles having a domain structure with a rest state of magnetization generally transverse to said path, and
    wherein magnetic flux conducts from said gap to said flux via along said path by rotation of said rest state magnetization during read operations.

4. A thin-film recording head according to claim 3 wherein said domain structure further comprises a plurality of individual domains with substantially parallel rest states of magnetization that alternate in opposing directions.

5. A thin-film recording head according to claim 4 wherein said first and second poles are generally P-shaped.

6. A thin-film recording head according to claim 5 wherein said first and second wings of said poles do not overlap and magnetic flux conducts laterally by domain wall motion from said wings to said gap during write operations.

7. A thin-film magnetic head configured for read and write operations comprising:
    an upper P-shaped pole having a narrow end and a wide end with a flux via region, said upper pole including a first area defined by a path extending parallel to an axis connecting said narrow end to said flux via region and a second area generally lateral to said first area in said wide end, said upper pole having a domain structure with rest state magnetization in a direction generally transverse to said axis;
    a lower P-shaped pole having a narrow end and a wide end with a flux via region mechanically connected to said flux via region of said upper pole, said lower pole including a first area defined by a path extending parallel to an axis connecting said narrow end to said flux via region and a second area generally lateral to said first area in said wide end, said lower pole having a domain structure with rest state magnetization in a direction generally transverse to said axis; and
    a non-magnetic gap layer disposed between said upper and lower poles and including a flux via for connecting said flux via regions of said poles, said gap layer further containing a winding disposed therein for conducting current, said winding configured to drive magnetic flux into and sense magnetic flux from said poles,
    wherein said upper and lower poles overlap at said first areas to define a magnetically isolated gap at said narrow ends and magnetic flux conducts from said gap to said flux via by rotation of said rest state magnetization during read operations, and
    wherein said second areas do not overlap and magnetic flux conducts laterally by domain wall motion from said second areas to said gap during write operations.

* * * * *